(12) United States Patent
Crater et al.

(10) Patent No.: US 7,146,408 B1
(45) Date of Patent: *Dec. 5, 2006

(54) METHOD AND SYSTEM FOR MONITORING A CONTROLLER AND DISPLAYING DATA FROM THE CONTROLLER IN A FORMAT PROVIDED BY THE CONTROLLER

(75) Inventors: Kenneth C. Crater, North Grafton, MA (US); Craig E. Goldman, Westborough, MA (US)

(73) Assignee: Schneider Automation Inc., North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,368

(22) Filed: Nov. 8, 1999

Related U.S. Application Data (63) Continuation of application No. 08/851,644, filed on May 6, 1997, now Pat. No. 5,982,362, which is a continuation-in-part of application No. 08/655,469, filed on May 30, 1996, now Pat. No. 5,805,442.

(51) Int. Cl.
  *G06F 13/00* (2006.01)
(52) U.S. Cl. .............. 709/219; 709/224; 709/250
(58) Field of Classification Search ............. 709/203, 709/208, 217, 219, 224, 250
See application file for complete search history.

(56) References Cited

U.S. PATENT DOCUMENTS

| | | | |
|---|---|---|---|
| 3,971,000 A | 7/1976 | Cromwell | |
| 4,319,338 A | 3/1982 | Grudowski et al. | 364/900 |
| 4,669,040 A | 5/1987 | Pettit | |
| 4,688,167 A | 8/1987 | Agarwal | |
| 4,845,644 A | 7/1989 | Anthias et al. | |
| 4,858,152 A | 8/1989 | Estes | |
| 4,897,777 A | 1/1990 | Janke et al. | 364/134 |
| 4,912,623 A | 3/1990 | Rantala et al. | |
| 4,918,690 A | 4/1990 | Markkula | |
| 4,937,777 A | 6/1990 | Flood et al. | 364/900 |
| 4,949,274 A | 8/1990 | Hollander et al. | |
| 4,953,074 A | 8/1990 | Kametani et al. | 364/132 |
| 4,969,083 A | 11/1990 | Gates | 364/147 |
| 4,992,926 A | 2/1991 | Janke et al. | 364/134 |
| 5,012,402 A | 4/1991 | Akiyama | 364/192 |
| 5,023,770 A | 6/1991 | Siverling | |
| 5,047,959 A | 9/1991 | Phillips et al. | |
| 5,072,356 A | 12/1991 | Watt et al. | |
| 5,072,412 A | 12/1991 | Henderson, Jr. et al. | 395/159 |
| 5,109,487 A | 4/1992 | Ohgomori et al. | |
| 5,122,948 A | 6/1992 | Zapolin | 364/131 |
| 5,131,092 A | 7/1992 | Sackmann et al. | 395/800 |
| 5,134,574 A | 7/1992 | Beaverstock et al. | |

(Continued)

FOREIGN PATENT DOCUMENTS

DE 44 10 171 C1 3/1994

(Continued)

OTHER PUBLICATIONS

Kao, James T; "Remote Microscope for Inspection of Integrated Circuits"; MIT Masters Thesis; Sep. 1995.

(Continued)

*Primary Examiner*—Viet D. Vu (57) ABSTRACT

An integrated control system comprises one or more controllers each equipped to perform a control function and to gather data (ordinarily from sensors) relevant to the control function. The data is combined with instructions, associated with the data, for causing a remote computer to generate a visual display incorporating the data in a predetermined format. A communication module establishes contact and facilitates data interchange with the remote computer over the World Wide Web.

32 Claims, 2 Drawing Sheets

U.S. PATENT DOCUMENTS

| | | | |
|---|---|---|---|
| 5,151,896 A | 9/1992 | Bowman et al. | |
| 5,151,978 A | 9/1992 | Bronikowski et al. | 395/200 |
| 5,157,595 A | 10/1992 | Lovrenich | 364/136 |
| 5,159,673 A | 10/1992 | Sackmann et al. | 395/325 |
| 5,161,211 A | 11/1992 | Taguchi et al. | |
| 5,162,986 A | 11/1992 | Graber | |
| 5,165,030 A | 11/1992 | Barker | |
| 5,179,700 A | 1/1993 | Aihara et al. | |
| 5,225,974 A | 7/1993 | Mathews et al. | 364/140 |
| 5,245,704 A | 9/1993 | Weber et al. | 395/200 |
| 5,251,302 A | 10/1993 | Weigl et al. | 395/250 |
| 5,253,341 A | 10/1993 | Rozmanith et al. | 395/200 |
| 5,283,861 A | 2/1994 | Dangler et al. | |
| 5,297,143 A | 3/1994 | Fridrich et al. | 370/85.3 |
| 5,297,257 A | 3/1994 | Struger et al. | 395/200 |
| 5,307,463 A | 4/1994 | Hyatt et al. | 395/275 |
| 5,321,829 A | 6/1994 | Zifferer | 395/575 |
| 5,349,675 A | 9/1994 | Fitzgerald et al. | |
| 5,398,336 A | 3/1995 | Tantry et al. | 395/600 |
| 5,406,473 A | 4/1995 | Yoshikura et al. | 364/140 |
| 5,420,977 A | 5/1995 | Sztipanovits | 395/160 |
| 5,440,699 A | 8/1995 | Farrand et al. | |
| 5,446,868 A | 8/1995 | Gardea et al. | |
| 5,490,276 A | 2/1996 | Doli, Jr. et al. | 395/700 |
| 5,528,503 A | 6/1996 | Moore et al. | |
| 5,594,858 A | 1/1997 | Blevins | 395/326 |
| 5,598,536 A | 1/1997 | Slaughter, III et al. | 395/200.16 |
| 5,613,115 A | 3/1997 | Gihl et al. | 395/701 |
| 5,619,412 A * | 4/1997 | Hapka | 701/36 |
| 5,623,652 A | 4/1997 | Vora et al. | 395/610 |
| 5,625,781 A | 4/1997 | Cline et al. | 395/335 |
| 5,631,825 A * | 5/1997 | van Weele et al. | 700/83 |
| 5,636,211 A * | 6/1997 | Newlin et al. | 370/465 |
| 5,652,849 A * | 7/1997 | Conway et al. | 715/719 |
| 5,664,101 A | 9/1997 | Picache | 395/200.8 |
| 5,684,375 A | 11/1997 | Chaffe | |
| 5,699,350 A | 12/1997 | Kraslavsky | |
| 5,702,323 A * | 12/1997 | Poulton | 482/8 |
| 5,734,831 A | 3/1998 | Sanders | |
| 5,737,491 A * | 4/1998 | Allen et al. | 704/270 |
| 5,737,529 A | 4/1998 | Dolin, Jr. et al. | 395/200.18 |
| 5,778,368 A * | 7/1998 | Hogan et al. | 707/10 |
| 5,790,977 A | 8/1998 | Ezekiel | |
| 5,801,689 A | 9/1998 | Huntsman | |
| 5,805,442 A | 9/1998 | Crater et al. | |
| 5,909,544 A * | 6/1999 | Anderson et al. | 709/208 |
| 5,950,006 A | 9/1999 | Crater et al. | |
| 5,956,487 A * | 9/1999 | Venkatraman et al. | 709/218 |
| 5,975,737 A | 11/1999 | Crater et al. | |
| 5,982,362 A | 11/1999 | Crater et al. | |
| 5,990,884 A | 11/1999 | Douma | |
| 5,997,167 A | 12/1999 | Crater et al. | |
| 6,002,340 A * | 12/1999 | Smith | 340/3.4 |
| 6,061,603 A | 5/2000 | Papadopoulos | |
| 6,061,721 A | 5/2000 | Ismael | |
| 6,131,067 A * | 10/2000 | Girerd et al. | 701/213 |
| 6,134,552 A | 10/2000 | Fritz | |
| 6,151,625 A | 11/2000 | Swales | |
| 6,201,996 B1 | 3/2001 | Crater | |
| 6,209,048 B1 * | 3/2001 | Wolff | 710/62 |
| 6,219,708 B1 * | 4/2001 | Martenson | 709/226 |
| 6,233,626 B1 | 5/2001 | Swales | |
| 6,282,454 B1 | 8/2001 | Papadopoulos | |
| 6,311,101 B1 | 10/2001 | Kastner | |
| 6,321,272 B1 | 11/2001 | Swales | |
| 6,327,511 B1 | 12/2001 | Naismsith | |
| 6,370,550 B1 | 4/2002 | Douma | |
| 6,370,569 B1 | 4/2002 | Austin | |
| 6,424,872 B1 | 7/2002 | Glanzer | |
| 6,434,157 B1 | 8/2002 | Dube | |
| 6,453,210 B1 | 9/2002 | Belotserkovskiy et al. | |
| 6,466,995 B1 | 10/2002 | Swales | |
| 6,484,061 B1 | 11/2002 | Papadopoulos | |
| 6,505,341 B1 | 1/2003 | Harris | |
| 6,618,754 B1 * | 9/2003 | Gosling | 709/220 |
| 2002/0176441 A1 | 11/2002 | Swales | |

FOREIGN PATENT DOCUMENTS

| | | |
|---|---|---|
| DE | 196 15 093 A 1 | 4/1996 |
| DE | 296 00 609 U1 | 3/1997 |
| EP | 0411869 A2 | 2/1991 |
| JP | 7325778 A | 12/1995 |
| WO | 0 542 657 A1 | 5/1993 |
| WO | WO 96 31047 A | 10/1996 |
| WO | WO 97 07486 A | 2/1997 |
| WO | 0814 393 A1 | 5/1997 |
| WO | WO97/18636 | 5/1997 |
| WO | WO 97/18636 | 5/1997 |
| WO | WO 98/53581 | 11/1998 |

OTHER PUBLICATIONS

"From Web Server to Railroad Layout", from web page http://rr-vs.informatik.uni-ulm.de/rr/LayoutControl.html.

"News Interactive Model Railroad", from web page http://rr-vs.informatik.uni/ulm.de/rr/WhatsNew.html.

"Frequency Asked Questions", from web page http://rr-vs.informatik.uni-ulm.de/rr/FAQ.html.

Putnam, Frederick A; "Internet-Based Data Aquisition and Control"; Sensors; Nov. 1999.

Fuhr, Peter L and Evan F Mowat; "Remote Interrogation and Control of Sensors via the Internet"; Sensors; Dec. 1995.

Stafford-Fraser, Quentin; "The Story of the Trojan Room Coffee Pot"; from web page http://www.cl.cam.ac.uk/coffee/qsf/timline.html.

Stafford-Fraser, Quentin; "The Trojan Room Coffee Pot";from web page http://www.cl.cam.ac.uk/coffee/qsf/coffee.html.

"The Trojan Room Coffee Machine";from web page http://www.cl.cam.ac.uk/coffee/coffee.html.

"Disk Drive with Embedded Hyper-Text Markup Langauage Server"; IBM Technical Disclosure Bulletin; Dec. 1995.

"aX announces Support for Opto 22 Ethernet B3000 Devices"; from web page at http://www.mnrcan.com/newsdetail.phtml?idno=25.

"aX Process Control"; from web page at http://www.mnrcan.com/ProcessControl.phtml.

"About LabCam"; from web page at http://people.cs.uchicago.edu/~peterp/LabCam/aboutLabCam.html.

"Bibliography"; from web page at http://www-2.csc.cmu.edu/Groups/xavier/www/papers.html.

Stafford-Fraser, Quentin; "Life and Times of the First Web Cam"; from web page http://www.cl.cam.ac.uk/coffee/qsf/cacm200107.html.

EDN Access; Test&Measurement; from web page http://archives.e-insite.net/archives/ednmag/reg/1996/060696/12 prod4.htm.

Misc web pages and documents from http://www.labtech.com.

Goldberg, Ken et al; Beyond the Web: Excavating the Real Wrold Via Mosaic; web page at http://www.ncsa.uiuc.edu/SDG/IT9...goldberg.html.

Goldberg, Ken et al; "Desktop Teleoperation via the World Wide Web"; IEEE International Conference on Robotics and Automation; 1995.

Soreida NN et al; "Mosaic access to real-time data from the TOGA-TAO array of moored buoys" Computer Networks and ISDN Systems; Dec. 1995.

Scharf Ronald et al; "Using Mosaic for Remote Test System Control Supports Distributed Engineering"; Institute of Conputer Aided Circuit Design.

Peryt, M and F. Momal; "Generic Repository and Search Engine for LHC Equipment Test Data"; Intl Conf on Accelerator; 1999.

Momal F et al; "A Control System based on Industrial Components for Measuring . . . "; web page at http://mish231.cem.ch/Docs/CSbIC.htm.

Web page at http://www.awe.com/mark/wwwf94/coxfig3.gif.

"Bradford Robotic Telescope—Intro", web page at http://www.telescope.org/rti/intro.html.
Cox, Mark and John Baruch; "Robotic Telescopes: An Interactive Exhibit on the World Wide Web"; web page at http://www.awe.com/mark/wwwf94/wwwf94.html.
"Welcome to Paul Hass's web server"; web page at http://www.hamjudo.com.
"Status of Paul's (Extra) Refrigerator"; web page at http://www.hamjudo.com/cgi-bin/refrigerator.
"Soda Can platform"; web page at http://www.hamjudo.com/notes/soda_platform.html.
"CD-ROM's in the Microwave"; web page at http://www.hamjudo.com/notes/cdrom.html.
"Tub status"; web page at http://hamjudo.com/cgi-bin/hottub.
"Frequently asked questions about Paul's hottub."; web page at http://hamjudo.com/hottub_notes.html.
"RoboRodentia II"; web page at http://www.elee.calpoly.edu/clubs/cs/www/RoboContest.
"The "Only" Coke Machine on the Internet"; web page at http://www.cs.cmu.edu/~coke/history_long.txt.
"Xavier has a new job"; web page at http://www-2.cs.cmu.edu/Groups/xavier/www.
"1771 Control Coprocessor"; Allen-Bradley; Dec. 1994.
Taylor, Ken and James Trevelyan; "A Telerobot on the World Wide Web"; Proceedings of the 1995 National Conference of the Australian Robot Association.
Taylor, Ken and James Trevelyan; "Australia's Telerobot on the Web"; 26th Internation Symposiukm on Industrial Robots; 1995.
"WWWF'94: Information Form"; web page from http://archive/ncsa.uiuc.edu/SDG/IT94/Agenda/Info_form.html.
"Mercury Project"; web page from http://www.usc/edu/dept/raiders.
Putnam, Fredrick; "LABTECHnet Visualization of a Weather Front".
Strauss, Richard; LABECH memo and other documents.
"LABTECHnet Frequently Asked Questions".
Putnam, Fredrick; "LABTECH News: Another superlative PR article"; email.
Putnam, Fredrick; "Public-domain IPC scheme moves Windows data 1000 times faster than DDE"; Personal Engineer and Instrumentation News.
"Installing and Using LABTECHnet".
Slater, "Controlled by the Web," Computer Networks and ISDN Systems 27 (1994).
Goldberg et al., "Beyond the Web: Manipulating the Real World," Computer Networks and ISDN Systems 28 (1995).
Soreide et al., "Mosaic Access to Real-Time Data from the TOGA-TAO Array of Moored Buoys," Computer Networks and ISDN Systems 28 (1995).
Gertz et al., "A Human-Machine Interface for Distributed Virtual Laboratories," IEEE Robotics & Automation Magazine (Dec. 1994).
Taylor et al., "A Telerobot on the World Wide Web," Nat. Conf. of Australian Robots Ass'n (1995).
"Realtime web browser, OLE controls take data-acq into best-of-breed realm," Personal Engineering, Mar. 1996, at 11.
"Want to View Your Plant's Operations? Surf Your Intranet," Control Platforms (Oct. 1997).
When Technology Standards Become Counterproductive, Kenneth C. Crater, President, Control Technology Corporation, Hopkinton, MA dated Jul. 9, 1999, pp. 1-5.
A White Paper State Language for Machine Control, Kenneth C. Crater, President, Control Technology Corporation, Hopkinton, MA dated Jul. 9, 1999, pp. 1-11.
New PC-based Process Control & Data Acquisition Software Integrates Remote Internet Capabilities with Fast Pentium Support, Fred A. Putnam, LABTECH President, pp. 1-3.
Aug. 1996 CONTROL Magazine—In The News—Electric Utility Industry Embarks on Automation Overhaul, pp. 1-10.
Jul. 1997 CONTROL Magazine—Magazine Software Review—NT Package Give Plant Access Through the Web, pp. 1-3.
Oct. 1996 CONTROL Magazine—Software Review—Article Archives, pp. 1-2.
ICS Instrumentation & Control Systems—Windows NT for real-time control: Which way to go?—ICS Magazine, pp. 1-8.
I&CS Jul. 1999—Special Report Software—Software: Open source OSs, objects, Web-based communications challenge status quo, (Wayne Labs, Senior Technical Editor), pp. 24-49.
Landis & Staefa MS 2000, pp. 1-2.
Landis & Staefa Standards and Open Protocols Integration System Architecture, p. 1.
Annabooks Bookstore, Programming and Interfacing the 8051, by Sencer Yeralan and Asutosh Ahluwalia, pp. 1-2.
SoftPLC Corporation—Java Support in SoftPLC Corp. Products, pp. 1-5.
Mach J. Company, MachJ, an enbeddable, clean room Java Virtual Machine, p. 1.
SoftPLC Corporation—The History of Programmable Controllers, Looking Back From the Year 2000 A.D. (Or, How Computers Replaced Proprietary PLC'S), pp. 1-7.
SoftPLC Corporation—TOPDOC: Advanced PLC program development & documentation software, pp. 1-12.
Control Engineering Online Magazine Articles (Jul. 1998)—No. thats's not a PC, it's a PLC, pp. 1-2.
Rockwell International Corporation, Allen-Bradley Introduces PLC-5/80E Controller for Ethernet Communication Networks.
Rockwell Automation—Search Results, pp. 1-2.
Rockwell International Corporation, Vision & Direction, The Direction of Automation Systems, pp. 1-4.
Rockwell International Corporation, Vision & Direction, The Role of Open Systems, pp. 1-4.
Rockwell International Corporation—Vision & Direction—The Direction of Automation Systems—Emergence of Application-Specific Control Solutions, pp. 1-2.
Rockwell International Corporation—Vision & Direction—The Direction of Automation Systems—The New Factory Worker, pp. 1-2.
Rockwell International Corporation, Vision & Direction, Control System Deliverables—The New Step, pp. 1-2.
Rockwell International Corporation, Vision & Direction, Conclusion & Acknowledgments, pp. 1-2.
Rockwell International Corporation—Choices—Perspectives on the Future of Automation Control, p. 1.
Rockwell International Corporation—Allen-Bradley—Networks—Ethernet for Industrial Control—An Ethernet White Paper—Apr. 21, 1998, pp. 1-13.
Rockwell International Corporation—Automation Systems Control—General—World-Class Automation Systems from Allen-Bradley, Last Updated: May 7, 1998, pp. 1-12.
PC Quest, Dec. 1997—Point, click, Control—C-Programmable controllers take the pain out of embedded control, pp. 1-2.
berthel—automation with imagination—PCI 100—Programmable logic controller for SIMATIC/IBM IPC, pp. 1-3.
YAHOO! Personalized Search Results for programmable logic controller internet access, pp. 1-3.
SIEMENS—SIMATIC report Jan. 1997—New in the SIMATIC Library, pp. 1-2.
Control Magazine Aug. 1998—Field Test—Dynamic Software Makes Control Integration Easier, pp. 1-2.
Design and Reuse Web Site—EDTN Network—Analyze IP Database Content—Analyse Reuse Blocks per taxonomy tree, pp. 1-10.
Engineering Information, Inc.—Ei CPX WEB [1990-94].
Using World Wide Web for Control Systems, F. Momal, C. Pinto-Pereira, AT Division CERN, 1211 Geneva 23, http://mish231.cern.ch/Docs/ICALEPCS/1995/icalep95.htm.
"Ethernet Base Gateway Product," AEG-Modicon, published 1991.
"Modicon Modbus Plus Network BM85 Bridge Multiplexer User's Guide," Groupe Schneider, Aug. 1995.
"Modicon Modbus Plus Network Planning and Installation Guide," AEG Schneider Automation, Apr. 1996.
"Open Modbus/TCP Specification," A. Swales, Sep. 3, 1997.
"MEB Installation and Programming Manual," Niobrara Research and Development Corporation, Sep. 24, 1997.
"MEB-TCP Installation and Programming Manual," Niobrara Research and Development Corporation, Oct. 1, 1997.

"Internet Protocol, Darpa Internet Program, Protocol Specification—RFC 791," Defense Advanced Research Projects Agency, Sep. 1981.

"Transmission Control Protocol, Darpa Internet Program, Protocol—Specification—RFC:793," Defense Advanced Research Projects Agency, Sep. 1981.

"Open MODBUS/TCP Specification," A. Swales, Sep. 3, 1997.

"[comp.unix.programmer] Unix-Socket-FAQ For Network Programming," Vic Metcalfe, Andrew Gierth and other contributors, Jan. 22, 1998.

"TCP/IP Illustrated, vol. 2, The Implementation," Gary R. Wright, W. Richard Stevens, 1997.

"Winsock 3 Information," Bob Quinn, 1995-1998 (last updated Dec. 5, 1998).

Website Information of PROFIBUS: Technical Overview.

Website Information of ODVA—The Open DeviceNet's Vendor Association.

Website of PROFIBUS International Technical—Welcome Page.

LABTECH Corporation website, http://www.labtech.com.

http://www.adeptscience.com/archive_pressroom/html/labtechnet. html; *Adapt PressRoom Archives. A Collection of Adept Scientific's archive news releases. Hot Coffee on the Internet!*

"Networking Reference Manual," 1994 National Instruments Corporation, Part No. 320587B-01, Sep. 1994, Copyright © 1993.

"Data Acquisition VI Reference Manual for Windows," 1994 National Instruments Corporation, Part. No. 320536B-01, Sep. 1994, Copyright © 1992.

"Tutorial for Windows," 1994 National Instruments Corporation, Part No. 320593B-01, Sep. 1994, Copyright © 1993.

Abstract of "Implementing distributed controls for FMC's using Internet utilities," S. S. Jagdale and N. Merchant; Computers of Industrial Engineering, vol. 31 No. 1-2, p. 87-90; Oct. 1996 (UK).

Abstract of "Process Control takes to the Net," Greg Paula, Mechanical Engineering vol. 118 No. 12 Dec. 1996, p. 55.

Abstract of "Remote interrogation and control of sensors via the internet," Peter L. Furh and Euan F. Mowat; Sensors, vol. 12 No. 12, 6 pp; Dec. 1995.

Abstract of "Process control takes to the Net," G. Paula; Mechanical Engineering, vol. 118, No. 12, p. 55, Dec. 1996.

Abstract of "Implementation of CAN/CAN bridges in distributed environments and performance analysis of bridged CAN systems using SAE benchmark," H. Ekiz, A. Kutlu and E. T. Powner; Conference Paper, IEEE Southeastern '97, Engineering the new energy, IEEE, p. 185-7, 1996.

Abtsract of "Managing interdisciplinary project terms through the Web," R.E. Goodman and P. Chinowsky; Conference Paper, WebbNet 96—World Conference of the Web Society, pp. 180-185, 1996.

Abstract of "Learning environment for a process automation system using computer networks," J. Lindfors, L. Yliniemi and K. Leivska; Conference Paper, Step '96—Genes, Nets and Symbols, pp. 137-143, 1996 (Finland).

Abstract of "Distributed agent systems for intelligent manufacturing,"D. H. Norrie and B. R. Gaines; Canadian Artificial Intelligence, No. 40, p. 31-3, Autumn 1996 (Canada).

Abstract of Proceedings of AUTOFACT 1995 Conference, "Today's Automated, Integrated Factory," Soc. Manuf., Eng., Dearborn, MI; 1995.

Abstract of "The ECOSSE Control HyperCourse," C. M. Merrick and J. W. Ponton; Computers & Chemical Engineering, vol. 20, Part B, p. S 1353-8, 1996 (UK).

Abstract of "Chemical-better batch controls," T. Crowl; Control & Instrumentation, vol. 28, No. 5, p. 53-4, May 1996 (UK).

Abstract of "Industrial software does 32-bit Windows, prepares for the net," W. Labs; I 8CS, vol. 69, No. 3, p. 23-6, 31-4, Mar. 1996, USA.

Abstract of "A case study for international remote machining;" G. C. I. Lin and Kao Yung-Chou; Conference Paper, Proc. SPIE-Int. Soc. Opt. Eng., vol. 2620, p. 553-60, 1995.

Abstract of "Standarization of long-distance protocols," R. Dinges; Journal Paper, Generation Changes in Network Changes in Network Conductor Systems, ITG—Fachberichte, vol. 134, p. 97-113, 1995 (West Germany).

Abstract of "Proceedings of AUTOFACT Conference," Soc. Manuf. Eng., 684 pp., Dearborn, MI; 1993.

Abstract of "Control system design V. Communications orchestrate process control," F. Glow; In Tech, vol. 36, No. 9, p. 68-74, Sep. 1989.

Abstract of "Functions and characteristics of local networks adapted to industrial applications," J. Morlais; Electronique Industrielle, No. 97, p. 56-63, Nov. 15, 1985; France.

Abstract of "Intelligent supervisory control of submerged-arc furnances," Markus A. Reuter, Carla Pretorius, Chloe West, Peter Dixon and Morne Oosthuizen, JOM vol. 18, No. 12, Dec. 1996, p. 49-51.

Abstract of "Stimulation on the integration of process control systems of rolling mill plants through standard networks,"Choo Young Yeol, Hwang Hwu Won and Kim Cheeha Proceedings of the Industrial Computing Conference, Instrument Society of America, Research Triangle Park, NC, USA. P 1-14; vol. 6, No. 1, 1996.

Abstract of "Environmental waste control digest," Clayton H. Billings; Public Works vol. 127 No. 7, 6 pp, Jun. 1996.

Abstract of "Experiments in tele-handling and tele-machining at the macro and micro sclaes, using the Internet for operational environment transmission," Mamoru Mitsuishi, Toshio Hori, Tomoharu Hikita, Masao Teratani, Takuro Watanabe, Hirofumi Nakanishi and Bruce Kramer; IEEE International Conference on Intelligent Robots and Systems vol. 2, 1995.

Abstract of "A phototyping and reverse engineering system for mechanical parts-on-demand on the national network," Fred Hansen, Elias Pavlakos, Eric Hoffman, Takeo Kanade, Raj Reddy, Paul Wright; Journal of Manufacturing Systems, vol. 12 No. 4, p. 269-281; 1993.

Abstract of "Mathematical model and optimization of furfural treating process," Tao Peng, Jinshou Yu and Huihe Shao; Huadong Huagong Xueyuan Xuebao/Journal of East China Institute of Chemical Technology vol. 17 No. 1, p. 99-104; Feb. 1991.

Abstract of User's Aspects of Telecommunication and Information Processing in Plant Factory; Hashimoto Yasushi (1); Journal of the Institute of Electronics, Information and Communications Engineers, vol. 78, No. 5, p. 475-81, Fig. 3, Ref. 7, 1995. (Japan).

Abstract of "High-efficient application technology of DCS from the viewpoint of users," Oka Norihito (1); Narita Tsutomu (1); (1) Yamatake-Honeywell Co., Ltd.; Otomeshon, vol. 40, No. 2, p. 24-28, Fig. 5, Part 2, 1995. (Japan).

Abstract of Users' experience with software tools for process integration. General results; Stougie, L.; Roeterink, H.J.H.; Van Wijk, A.; Stikkelman, R.M.; Nov. 1996.

Abstract of "Integrated design and process technology. vol. 1;" Cooke, D.; Kraemer, B.J.; Sheu, P.C.Y.; Tsai, J.P.; Mittermeir, R.; Society for Design and Process Science, p. 51-57; 1996. (USA).

Abstract of "Integrated design and process technology. vol. 2;" Tanik, M.M.; Bastani, F.B.; Gibson, D.; Fielding, P.J.; Society for Design and Process Science, p. 423-430, 1996. (USA).

Abstract of "Integrated design and process technology. vol. 2" Tanik, M.M.; Bastani, F.B.; Gibson, D.; Fielding, P.J.; Society for Design and Process Science, p. 306-312, 1996.

Abstract of "Need low-cost networking consider DeviceNet," W. H. Moss; InTech vol. 43:11; p. 30-31, Nov. 1996.

"Plastic Car Bodies Pass the Crash Test," mechanical engineering; vol. 118, No. 12; Dec. 1996.

"Remote Interrogation and Control of Sensors via the Internet," Sensors and Systems; Peter L. Fuhr and Euan F. Mowat; University of Vermont; pp. 25-30; Dec. 1999.

Momal, et al., "Using World-Wide Web for Control Systems," International Conference on Accelerator and Large Experimental Physics Control Systems, 1995.

Williams, Tom, "Java goes to work controlling networked embedded systems", Computer Design, Aug. 1996.

Kubota, Yukihiro et al, "Proposal of the robot system with information sending mechanism", Conference of the Robot Society of Japan, Nov. 1996.

* cited by examiner

METHOD AND SYSTEM FOR MONITORING A CONTROLLER AND DISPLAYING DATA FROM THE CONTROLLER IN A FORMAT PROVIDED BY THE CONTROLLER

CROSS-REFERENCE TO RELATED APPLICATION

This is a continuation of application Ser. No. 08/851,644, filed May 06, 1997, now U.S. Pat. No. 5,982,362 which is itself a continuation-in-part of application Ser. No. 08/655,469, filed May 30, 1996 now U.S. Pat. No. 5,805,442.

FIELD OF THE INVENTION

The present invention relates to industrial automation, and in particular to communication with and among programmable controllers for operating and monitoring industrial processes and equipment.

BACKGROUND OF THE INVENTION

Sophisticated industrial processes, such as oil refining, automobile assembly or power generation, require the cooperative execution of numerous interdependent tasks by many different pieces of equipment. The enormous complexity of ensuring proper task sequencing and management, which requires not only procedural logic but constant monitoring of equipment states to organize and distribute operations and detect malfunction, has resulted in the widespread adoption of programmable controllers. These controllers operate elaborate industrial equipment in accordance with a stored control program. When executed, the program causes the controller to examine the state of the controlled machinery by evaluating signals from one or more sensing devices (e.g., temperature or pressure sensors), and to operate the machinery (e.g., by energizing or de-energizing operative components) based on a procedural framework, the sensor signals and, if necessary, more complex processing. The "inputs" to a particular controller can extend beyond the sensed state of the equipment the controller directly operates to include, for example, its environment, the state of related machinery or the state of its controllers.

Control requirements become even more complex when different aspects of the same overall process are assigned to remotely situated equipment. Such configurations often require reliable, high-bandwidth serial communication links to provide the necessary interconnection and handle data transfer among controllers and the sensors relevant to their operation.

Ordinarily, process operation is monitored, at least intermittently, by supervisory personnel by means of one or more central management stations. Each station samples the status of controllers (and their associated sensors) selected by the operator and presents the data in some meaningful format. The management station may or may not be located on the same site as the monitored equipment; frequently, one central station has access to multiple sites (whether or not these perform related processes). Accordingly, communication linkage can be vital even in traditional industrial environments where process equipment is physically proximate, since at least some supervisory personnel may not be.

To facilitate the necessary communication, the controller processors and related computers (such as monitoring stations) are arranged as a computer network. A network, basically, is a collection of interconnected computers that use some consistent protocol to communicate with one another. Typically, the network is organized such that any computer may communicate with any other network computer. The communication protocol provides a mechanism by which messages can be decomposed and routed to a destination computer identified by some form of address. The protocol may place a "header" of routing information on each component of a message that specifies source and destination addresses, and identifies the component to facilitate later reconstruction of the entire message by the destination computer. This approach to data transfer permits the network to rapidly and efficiently handle large communication volumes without reducing transfer speed in order to accommodate long individual messages, or requiring every network computer to process every network message. The degree of routing depends on the size of the network. Each computer of a local network typically examines the header of every message to detect matches to that computer's identifier; multiple-network systems use routing information to first direct message components to the proper network.

Controllers have been interconnected by means of computer networks for some time; see, e.g., U.S. Pat. No. 5,307,463. In typical systems, a monitoring computer, which may be remotely located from any or all of the controllers to which it has access, periodically queries the controllers to obtain data descriptive of the controlled process or machine, or the controller itself. This data is then available for analysis by the monitoring computer. Heretofore, however, the type of information obtainable, on demand, from a controller has been limited, while the interface used to present the information on the monitoring computer is typically crude. The latter condition results from the multiplicity of data types offered by the controller. Were each type of data to be rendered in a format suited to that data, it would be necessary to equip the monitoring computer with multiple interfaces, and configure the operating application to ascertain the type of data before selecting and launching the proper interface. Not only does this scheme impose a substantial real-time support burden on the monitoring computer, but would also require a constantly expanding repertoire of graphical capabilities keyed to new forms of data reported by the controllers. This can be especially cumbersome in highly—even internationally—distributed environments, since the controllers and their functionalities may be programmed by personnel having no contact with those responsible for central monitoring.

DESCRIPTION OF THE INVENTION

Brief Summary of the Invention

The present invention utilizes the capabilities of the Internet and, more particularly, the interactive capabilities made available by resources such as the World Wide Web to shift the burden of providing user interfaces for changing forms of data from monitoring computers to the controllers that actually gather and report the data. By combining data with functionality for displaying that data at the individual controller sites, the need to equip monitoring computers with specialized graphic capabilities is eliminated, along with the need for intensive, ongoing cooperation between engineers responsible for programming controllers and those who configure the computers that perform monitoring. Moreover, because Internet users are typically billed for connectivity at a single rate, the long-distance charges that would accrue through use of telephone lines for data communication are eliminated.

In accordance with the invention, an integrated control system comprises one or more controllers each equipped to perform a control function and to gather data (ordinarily from sensors) or visual information (e.g., from a video camera) relevant to the control function. "Relevant" data includes, at a minimum, any information upon which control decisions are made or states shifted, but can also include information obtained from sensors not directly connected to the controller (e.g., involving other controlled machines) but which is nonetheless meaningful to supervisory personnel. For example, a chemical synthesis process may be carried out at a temperature controlled to stay within an operating range, but the optimal temperature may depend on the output of a previous process feeding into the synthesis; in this case, the temperature of the synthesis process as well as the output of the previous process are relevant control parameters with respect to the synthesis process. Visual information may include real-time video or periodically sampled images of control panels, gauges indicating a parameter such as temperature, indicator lights or, most usefully, portions of the controlled equipment itself. In addition, a file which may be contained, for example, in the web page of the video transmission site computer, can include previously stored video data for comparison with current video data. For example, the stored data may be historical data comprising previously recorded video images of machine conditions at an earlier time, or may instead comprise reference images showing, for example, normal machine operation.

Each controller contains computer storage means, such as computer memory (volatile and/or non-volatile, such as random-access memory ("RAM"), programmable read-only memory ("ROM") or Flash ROM), or a mass storage device such as a hard disk or CD-ROM, for storing the relevant data and instructions, associated with the data, for causing a remote computer to present the data (e.g., by generating a visual display incorporating the data) in a predetermined format; and a communication module for establishing contact and facilitating data interchange with the remote computer. The remote computer, in turn, also includes a communication module compatible with the controller-borne module, and which enables the remote computer to download the data and associated instructions from one or more controllers. The remote computer also includes a facility for processing the instructions to create a user interface—that is, a visual display, which may include video and/or graphics, or other presentations having a predetermined format—encoded by the instructions, and which incorporates the data or otherwise enables the monitoring engineer to gain as much information about the controller as possible. In this way, controller data is coupled to instructions for presenting that data, and this totality of information is continuously accessible, on a freely selective basis, to the remote computer.

It should be stressed that the system may include more than one remote monitoring computer, and any of these may not, in fact, be "remote" (in terms of distance) at all; instead, they may reside at the same site as the controlled process or equipment. Ordinarily, the monitoring computer or computers operate as peers with respect to the controllers on a flat network topology.

The invention facilitates a complete window into the operation of one or more controllers and, therefore, the industrial equipment they operate. Using the invention, remotely located personnel can monitor the efficiency or overall behavior of the equipment, visually check machine components, workpieces, or other critical components of the controlled system. Additionally, the monitoring engineer can perform diagnostic checks, or even effect certain maintenance operations. For widely dispersed control and supervisory operations, supervisory computers interact with the controllers over the Internet, with the controllers continuously connected to the Internet as "nodes." In local operations, the flexibility conferred by Internet formalisms can be retained on a restricted, internal network.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

The Internet, which can provide the communication medium of the present invention, is a worldwide "network of networks" that links millions of computers through tens of thousands of separate (but intercommunicating) networks. Via the Internet, users can access tremendous amounts of stored information and establish communication linkages to other Internet-based computers.

Much of the Internet is based on the client-server model of information exchange. This computer architecture, developed specifically to accommodate the "distributed computing" environment that characterizes the Internet and its component networks, contemplates a server (sometimes called the host)—typically a powerful computer or cluster of computers that behaves as a single computer—that services the requests of a large number of smaller computers, or clients, which connect to it. The client computers usually communicate with a single server at any one time, although they can communicate with one another via the server or can use the server to reach other servers. A server is typically a large mainframe or minicomputer cluster, while the clients may be simple personal computers. Servers providing Internet access to multiple subscriber clients are referred to as "gateways"; more generally, a gateway is a computer system that connects two computer networks.

In order to ensure proper routing of messages between the server and the intended client, the messages are first broken up into data packets, each of which receives a destination address according to a consistent protocol, and which are reassembled upon receipt by the target computer. A commonly accepted set of protocols for this purpose are the Internet Protocol, or IP, which dictates routing information; and the transmission control protocol, or TCP, according to which messages are actually broken up into IP packets for transmission for subsequent collection and reassembly. TCP/IP connections are quite commonly employed to move data across telephone lines.

The Internet supports a large variety of information-transfer protocols. One of these, the World Wide Web (hereafter, simply, the "web"), has recently skyrocketed in importance and popularity; indeed, to many, the Internet is synonymous with the web. Web-accessible information is identified by a uniform resource locator or "URL," which specifies the location of the file in terms of a specific computer and a location on that computer. Any Internet "node"—that is, a computer with an IP address (e.g., a server permanently and continuously connected to the Internet, or a client that has connected to a server and received a temporary IP address)—can access the file by invoking the proper communication protocol and specifying the URL. Typically, a URL has the format http://<host>/<path>, where "http" refers to the HyperText Transfer Protocol, "host" is the server's Internet identifier, and the "path" specifies the location of the file within the server. Each "web site" can make available one or more web "pages" or documents, which are formatted, tree-structured repositories of information, such as text, images, video, sounds and animations.

An important feature of the web is the ability to connect one document to many other documents using "hypertext" links. A link appears unobtrusively as an underlined portion of text in a document; when the viewer of this document moves his cursor over the underlined text and clicks, the link—which is otherwise invisible to the user—is executed and the linked document retrieved. That document need not be located on the same server as the original document.

Hypertext and searching functionality on the web is typically implemented on the client machine, using a computer program called a "web browser." With the client connected as an Internet node, the browser utilizes URLs—provided either by the user or a link—to locate, fetch and display the specified documents. "Display" in this sense can range from simple pictorial and textual rendering to real-time playing of audio and/or video segments or alarms, mechanical indications, printing, or storage of data for subsequent display. The browser passes the URL to a protocol handler on the associated server, which then retrieves the information and sends it to the browser for display; the browser causes the information to be cached (usually on a hard disk) on the client machine. The web page itself contains information specifying the specific Internet transfer routine necessary to retrieve the document from the server on which it is resident. Thus, clients at various locations can view web pages by downloading replicas of the web pages, via browsers, from servers on which these web pages are stored. Browsers also allow users to download and store the displayed data locally on the client machine.

Most web pages are written in HyperText Markup Language, or HTML, which breaks the document into syntactic portions (such as headings, paragraphs, lists, etc.) that specify layout and contents. An HTML file can contain elements such as text, graphics, tables and buttons, each identified by a "tag." Markup languages, however, produce static web pages.

Recent innovations have allowed web-page designers to overcome the static page appearance dictated by HTML. The Java language is a well-known, machine-independent, interpreted computer language that facilitates dynamic display of information. Java-encoded "applets" are stand-alone programs embedded within web pages that can interact with the user locally, display moving animations and perform other functions on "Java-capable" browsers—that is, browsers which include a Java interpreter. The applet is transferred to the browser along with other web-page information and is executed by the Java interpreter; the data acted upon by the applet can be located on the same or a different web page, or a different server entirely, since applets can themselves cause the browser to retrieve information via hypertext links.

ActiveX controls represent an alternative to Java, although they typically require compatible browsers and computers. These programs can be written in many computer languages (including Java) and usually compile to machine code, in which case they operate only in conjunction with browsers running machines with appropriate processor architectures. Some languages, however, will compile to machine-independent byte codes, which can run on a variety of processor architectures.

Suppose, for example, that a client user instructs the client-resident browser to obtain a document having the URL http://host/file.html. The browser contacts the HTTP server running on "host," and requests the document file.html. The server finds this document and sends it according to the proper Internet protocol, along with a Multipurpose Internet Mail Extension or "MIME" identifier that specifies the document's type. When the client receives the document, the browser examines the MIME to determine whether it is capable of autonomously displaying the document, or whether an external resource (e.g., a specialized viewer to display video segments) is necessary. In a simple case, the document might contain text and graphics specified in HTML, and specify an image residing in a different file on a different server or on the same server. The browser renders the document in accordance with the HTML instructions and requests the image, displaying it in the document as specified by the instructions when the image arrives. In more complex cases the document may contain, for example, Java instructions, which are passed to the browser's Java interpreter.

Key to the concept of a web page, therefore, is the division of functionality between the client-based browser and the server-based web page, and the particular roles assigned to each. The browser locates, fetches and displays resources, executes hyperlinks and applets, and generally interprets web-page information; the web page contains data, hyperlink addresses, transfer protocols and computer instructions defining "potential functionality" that may be executed by the browser.

Ordinarily, web pages reside on servers accessible via the Internet. However, the above-discussed mode of splitting functions between web pages and browsers can be instituted on internal networks as well. These networks, sometimes called "intranets," support the TCP/IP communication protocol and typically serve the needs of a single business (or business department), which may be located at a single site (with individual clients connected by a simple local-area network) or multiple physically dispersed sites requiring a wide-area network but not access to the Internet. Various of the computers forming the intranet network can be utilized as servers for web pages, each with its own URL and offering access to network client computers via TCP/IP. A custom "web page" can be written for the controller in such an intranet. In such a case, JAVA applet software, or similar executable code, can be employed to design a page or screen providing a menu containing a variety of monitoring tools for the system. Various monitoring functions can be executed by the controller when these monitoring tools are selected in accordance with a predetermined protocol or as selected by a monitoring engineer.

Figure 1:
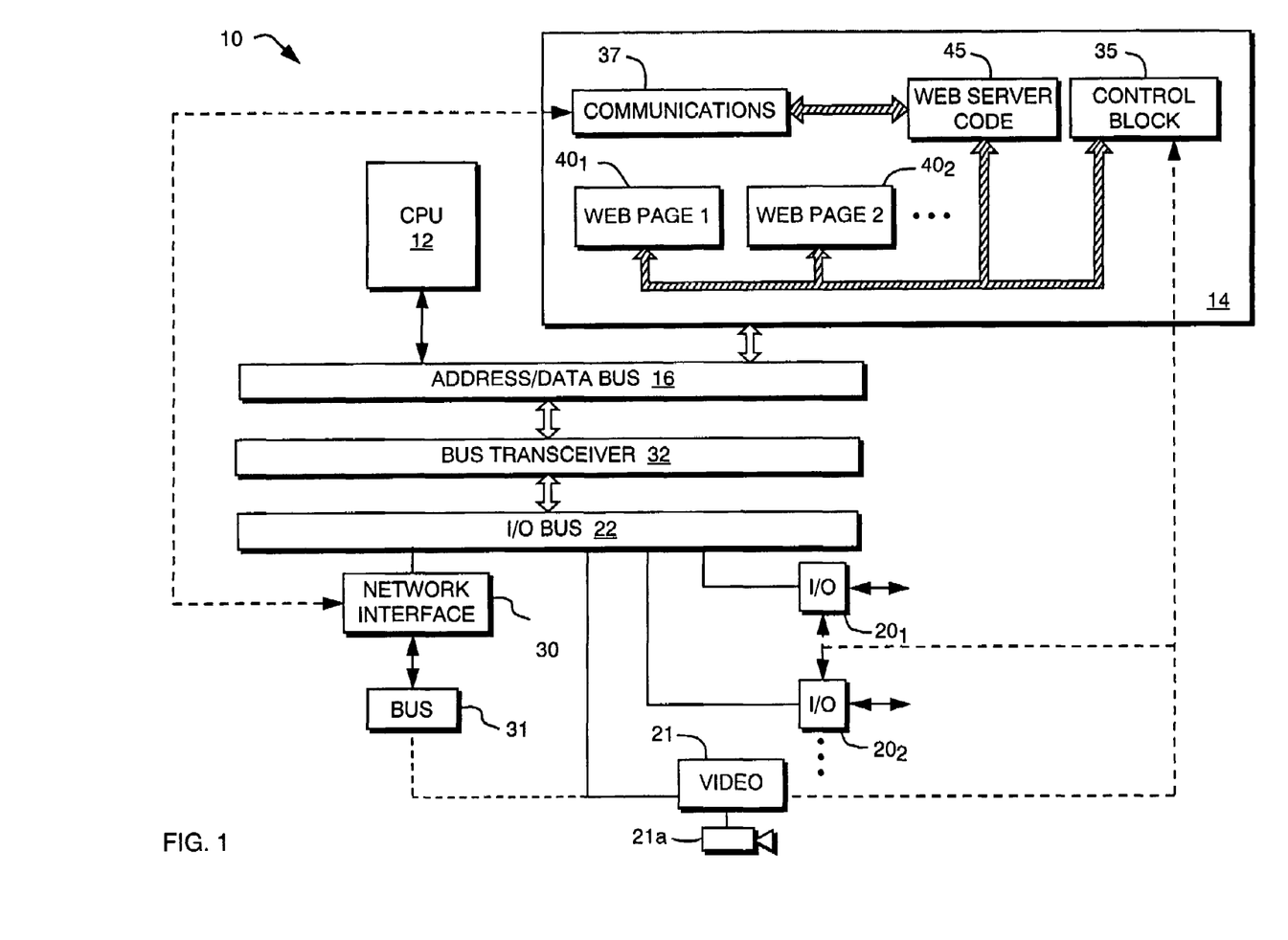
FIG. 1 schematically depicts a controller in accordance with the present invention.
Figure 2:
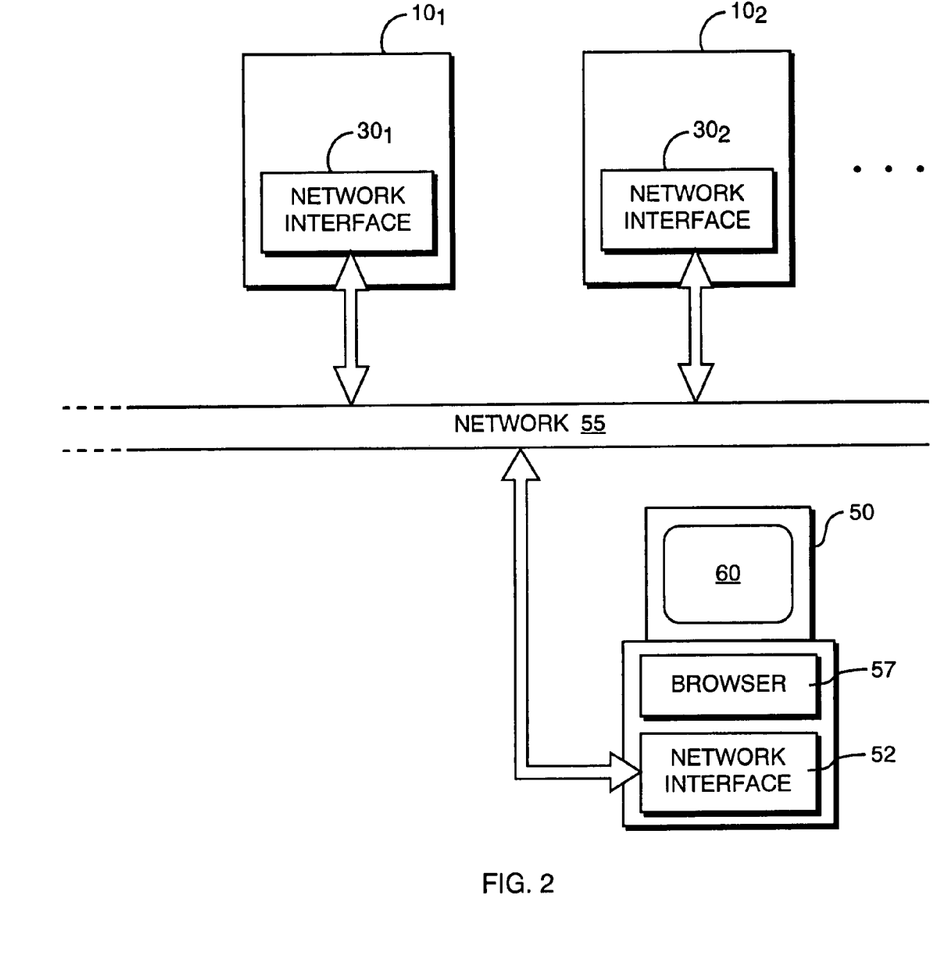
FIG. 2 schematically depicts a system incorporating multiple controllers as shown in FIG. 1 and a browser-equipped computer capable of accessing data associated therewith.

The manner in which this divided functionality can be incorporated into a bank of controllers and a monitoring system is illustrated in FIGS. 1 and 2. With reference, first, to FIG. 1, a representative controller architecture is shown generally at 10. The controller 10 executes program instructions to operate, for example, a piece of industrial equipment, and includes a central processing unit ("CPU") 12 and one or more computer storage devices indicated generally at 14. Ordinarily, storage device 14 is composed of a combination of volatile RAM for temporary storage and processing, and non-volatile, programmable read-only memory ("PROM") that contains permanent aspects of the controller's operating instructions; however, computer storage 14 can, if desired, include mass-storage facilities such as a hard disk, CD-ROM drive, etc. Such on-board devices are useful if web pages or security features are expected to change frequently.

CPU 12 and computer storage 14 communicate over an internal system bus 16. The system further includes a series of input/output modules shown representatively at $20_1$, $20_2$ that sense the condition of, and send control signals to, the controlled machine over a communication link (indicated by arrows). This communication link facilitates the bi-directional exchange of signals between each I/O module and an associated device (e.g., a sensor or an actuator).

In addition, the system includes video block 21 and a video camera (or a bank of video cameras) denoted generally at 21*a*. These are preferably digital video cameras associated with the monitored equipment which are directed at those portions of the monitored equipment which contain relevant visual information, such as operative machine components from which the position or status of a workpiece can be verified. Video block 21 contains appropriate, conventional, circuitry for digitizing still images captured by video camera assembly 21*a* or for transmitting full motion video signals received from camera 21*a* as streaming video over the Internet as part of a web site, for example, by way of any other suitable communication channel. In addition, video block 21 will be responsive to commands issued by a remote computer which commands may include: selection of a particular camera from the bank of video cameras, changing the orientation of a camera, altering the video image capture rate of a particular camera, and/or responding to instructions regarding how the video information is to be transmitted. The signals from such a video camera assembly 21*a* will be an additional input to I/O bus 22 as shown in FIG. 1, or, optionally, to a separate high bandwidth bus 31 for communication to the network interface 30 (for high bandwidth transmission of data to a network-based host).

I/O modules 20, as well as a network interface 30 that connects the controller 10 to a computer network, reside on or define a secondary I/O bus 22, which is driven by a bus transceiver 32; in effect, buses 16, 22 and bus transceiver 32 form a single logical bus. The computer network may be a local-area network of machines communicating via, for example, the Ethernet protocol, or a direct link to the Internet. In a local-area network, the computers can implement TCP/IP over the low-level Ethernet hardware-management routines to create an intranet, or can instead (or in addition) be tied into the Internet as a node via, for example, telephone hookup to an external host computer serving as a commercial Internet provider.

Storage 14 contains a series of functional blocks or modules that implement the functions performed by controller 10 through operation of CPU 12. A control block 35 contains instructions for operating I/O modules 20. These instructions are read in rapid sequence and interpreted to examine the condition of selected sensing devices associated with the controlled equipment, and, based thereon, to cause the Controller to send appropriate operative control signals to the equipment. Typically, the instructions are written in a relatively high-level language that permits not only manipulation of input and output data, but also arithmetic and timing functions, file-handling capabilities and other complex tasks. These instructions are translated into machine-readable code by means of an interpreter. For example, one standardized type of instruction symbolically represents control functions according to a relay ladder diagram; it is preferred, however, to utilize state-control languages that represent controller actions in terms of steps, each of which consists of a command that creates action and one or more instructions for leaving the step. Interpreters for these and other types of controller languages are well characterized in the art. See, e.g., U.S. Pat. Nos. 5,321,829 and 5,287,548 (the entire disclosures of which are hereby incorporated by reference) and the QUICKSTEP™ User Guide published by Control Technology Corporation, Hopkinton, Mass. Control block 35 contains both the specific high-level instructions for operating the controller 10 and the interpreter module for translating these into instructions processed by CPU 12; its operative relationship to I/O modules 20 is indicated by the dashed line.

A network communication block provides programming to operate local-area network hardware and/or to connect with a remote network or network host. In the latter case, communication module 37 drives a modem within network interface 30 or other data-transmission circuitry to transfer streams of digitally encoded data over telephone or other communication lines.

Storage 14 also contains data structures defining one or more web pages shown representatively at $40_1$, $40_2$. The web pages 40 consist of ASCII data obtained from one or more of I/O modules 20, HTML formatting instructions and associated data, "applet" instructions that cause a properly equipped remote monitoring computer 50 (FIG. 2) to display the data in a dynamic fashion, or hyperlinks to other web pages, objects or applets. For example, an applet might cause temperature data to be displayed as a graphical representation of a thermometer, with the height of the rendered mercury column dynamically varying in proportion to the data from I/O modules 20 (and constantly provided to the remote computer via network interface 30); pressure data might be represented in the form of a graphically rendered needle-type pressure gauge. Such renderings and the integration of data therein are straightforwardly implemented by those skilled in the art (and familiar, for example, with the Java language) without undue experimentation.

In accordance with the invention, web pages for the monitoring computer, or other remote computer in the control system, can be constructed to additionally display video information. Digital cameras (for example, which are available in miniature sizes and may operate on a 12 volt DC power supply), readily allow still image capture. Digital cameras capture images on a charge-coupled device, which images are then downloaded onto the RAM storage of the camera. Pictures may be transferred from the video camera assembly 21*a* and video block 21 to the monitoring computer 50 (FIG. 2) by way of the network interface 30 under command of the JAVA applet or other appropriate software for image reconstruction on the display monitor being used. Images can be downloaded from the camera to the controller computer and can be refreshed, as desired, with each download. Full motion video is readily achievable through use of appropriate video cameras in camera assembly 21*a*.

The resultant video information can then be transmitted from the controller 10 back to the monitoring computer 50, in the manner desired. For example, individual images or full motion video can be transferred back across the Internet to the web page of the monitoring computer 50. It is also possible to provide for switching between presentation formats, e.g., from periodically refreshed still images to full motion video (typically in response to instructions issued by the monitoring computer). This may be useful, for example, in the case of a military installation or a nuclear site. Appropriate circuitry for accomplishing this switching will be provided in video block 21, as desired, in the particular application as will be understood by those skilled in the art.

A bank of video cameras can be arranged to provide alternative views of the monitored equipment, the monitoring computer or other meaningful visual information. When assessing operation of the controlled system, the monitoring engineer may select which video camera image from the images captured by the video camera bank is to be displayed, as well as the length of time such display is desired. The monitoring engineer scanning the video/graphic display may decide, for example, to make an adjustment to the equipment and to check visually to ascertain whether the expected response or event has occurred at the remote machine or in the remote process in response to the adjustment. Alternatively, database storage of the images can be provided to facilitate subsequent display of one or more images as part of the control sequence.

Moreover, historical and/or reference video data may be stored within, for example, a file contained in a web page of the computer at the video transmission site. As stated earlier, historical video data shows machine operation at an earlier time, while reference video data shows normal machine operation. This previously stored data may be selected for presentation by a remote operator for comparison with current video images (e.g., in a side-by-side window configuration for simultaneous presentation, which may also include a graphic frame illustrating a selected control or comparison parameter).

Accordingly, the present invention permits a remote operator to visually check a portion of the controlled equipment to verify that the machine is operating in accordance with the data being received. For example, a command for controller actuation of a piston may be given and a video camera can be used to verify that the piston has been actuated. Additionally, a video camera can transmit images of gauges for verification that a control parameter conforms to data received from the controlled system, or that a circuit breaker has opened and a portion or all of the system has been shut down. As will be understood by one skilled in the art, there are any number of useful visual checks that can be performed by a monitoring engineer with respect to the controlled system using the video information obtained in accordance with the invention.

Referring again to FIG. 1, management and transmission of web pages 40 to a querying computer is handled by a web server module 45, which allows controller 10 to function as a network server. Once again, the features of this module are conventional in the art; see, e.g., Yuval Fisher, *Spinning the Web* (Springer 1996).

Incoming data from I/O modules 20 may be processed by control block 35 before being copied into one of the web pages 40. Because of the linking capabilities of the web, it is not necessary for the data to be stored in the web page containing the display instructions; instead, the latter page may contain a "hyperlink" pointer to a different web page in which data is accumulated. In addition, a web page can obtain data from other web pages (e.g., from different controllers) by accessing those web pages when appropriate. For example, if a cluster of controllers is operationally related such that data from one is usefully combined with data from the others, each page of the cluster can contain instructions to access the other pages (or their associated data pages) when accessed by a user, and the applet configured to present data from the entire cluster. Alternatively, the applet can be configured to cause the client's browser to access the web page. As used herein, data is "associated with" a web page or an applet if it is stored as part of the web page or applet, or stored in a directly or indirectly hyperlinked web page.

Refer now to FIG. 2, which illustrates the manner in which multiple versions of the controller 10 are linked and queried by one or more monitoring computers. The querying computer 50, which functions as a network client, may be, for example, a personal computer running the Windows graphical user interface supplied by Microsoft Corp. Computer 50 includes a network interface 52, which facilitates connection to and data transfer through a computer network 55 (which may, again, be a local network, the Internet, or an Internet-linked local network). The communications relevant to the present invention are handled by a web browser 57, which resides within computer 50 and operates the computer's display (e.g., video or liquid crystal) 60. Naturally, computer 50 also contains various conventional components, i.e., system storage, an operating system and a graphical user interface, and a keyboard and/or position-sensing device (e.g., a mouse) for accepting input from the user. For convenience of presentation, these are not shown.

Browser 57 contains functionality for locating and fetching, via network 55, web items (e.g., static pages or pages containing dynamic applets) identified by a URL, displaying these, executing applets, executing hyperlinks contained in web pages and selected by the user or invoked in an executing applet, and generally interpreting web-page information. The web items ordinarily are contained in the web pages of one or more controllers $10_1$, $10_2$, etc. As explained earlier, the web pages contain data, hyperlink addresses, transfer protocols and computer instructions defining applets, or links thereto. Browser 57 may be any of the numerous available web browsers, e.g., NETSCAPE NAVIGATOR (supplied by Netscape Communications Corp.) or MOSAIC (different versions of which are available free of charge at a variety of web sites).

In a working system, the network interface $30_1$, $30_2$, etc. of every controller in the system is constantly active and in communication with network 55, facilitating access by computer 50 to any controller-based web page(s) at any time. In this way, computer 50 can examine the data associated with any controller merely by specifying the appropriate URL of the controller's primary web page. The web page (and, preferably, an applet associated therewith) is copied to browser 57 and displayed along with the relevant, timely data. For example, the applet, executing on client computer 50, can autonomously access data from a web page different from the primary page the client user originally specified, all in a manner completely invisible to the user. Such access can be periodic or essentially continuous for data subject to rapid change.

Naturally, the network accessibility of control data, particularly over the Internet, raises security issues. It may be desirable to equip controller-based web pages with a password access feature, whereby browser 57 or an executing applet must present a password before being accorded access to associated data. In addition, the data may be encrypted before being placed on the network. These functions are handled by communication module 37, which acts as a gatekeeper to web server module 45. Security-clearance functions are conventional and readily implemented by those skilled in the art.

Security becomes particularly important if the controller-based web pages allow client computer 50 not only to access data, but to modify it as well. For example, while "read-only" access to control data suffices to inform the client user of the state of a controlled machine or process, the user cannot, if limited to such access, influence the operation of the controller. It may prove desirable, therefore, to allow an appropriately authorized client to directly modify control parameters (which may, for example, be stored on a restricted-access web page) that determine the operation of the controller and, hence, the controlled machine or process. Indeed, a controller-based applet invoked by the user's interaction with one of the controller's web pages can permit the remotely situated client user to operate the controller hardware—for example, causing the controller to execute a reset routine that restarts automated equipment following shutdown, or causing the controller to operate in a step-by-step fashion for diagnostic purposes.

It will therefore be seen that the foregoing represents a highly extensible and flexible approach to remote access to and presentation of controller information. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A controller capable of interacting with a remotely located computer, the controller comprising:
   a. a data-gathering unit configured to gather data relevant to an industrial control function; and
   b. a web server configured to receive a request from the remotely located computer and, in response to the request, configured to transmit to the remotely located computer instructions associated with the data, execution of the instructions by the remotely located computer causing said computer to present the data in a predetermined format wherein the data is displayed in a dynamic fashion on the remotely located computer and to periodically request updated data from the web server.

2. The controller of claim 1 wherein the web server is configured to receive requests and transmit instructions over the Internet.

3. The controller of claim 1 wherein the web server implements TCP/IP.

4. The controller of claim 1 wherein requests are received and instructions transmitted in accordance with the Hyper-Text Transfer Protocol.

5. The controller of claim 1 wherein the instructions define a web page for presentation on a browser running as an active process on the remotely located computer.

6. The controller of claim 5 wherein the controller comprises at least one input/output module, the web page comprising data gathered from the at least one module and formatting instructions.

7. The controller of claim 6 wherein the web page further comprises applet instructions execution of which causes the remotely located computer to periodically request updated data from the controller.

8. A method of obtaining and presenting data associated with a control system, the method comprising the steps of:
   a. gathering data relevant to an industrial control function;
   b. storing (i) the data and (ii) instructions defining a web page; and
   c. receiving a request from the remotely located computer and, in response to the periodic request, transmitting the instructions to the remotely located computer, execution of the instructions by the remotely located computer causing said computer to present the data in a dynamic fashion in accordance with the web page and to periodically request updated data.

9. The method of claim 8 wherein requests are received and instructions transmitted over the Internet.

10. The method of claim 8 wherein requests are received and instructions transmitted using TCP/IP.

11. The method of claim 8 wherein requests are received and instructions transmitted in accordance with the Hyper-Text Transfer Protocol.

12. The method of claim 8 wherein the web page is presented by a browser running as an active process on the remotely located computer.

13. The method of claim 12 wherein the web page comprises (i) gathered data and (ii) formatting instructions.

14. The method of claim 13 wherein the web page further comprises applet instructions execution of which causes the remotely located computer to display the data in the dynamic fashion.

15. The method of claim 14 wherein the data is continuously generated, the instructions causing the remotely located computer to continuously request the changing data from the controller and to display the retrieved data.

16. The method of claim 8 wherein the control function comprises operation of an industrial machine, the data-gathering step comprising receiving data from the machine.

17. The method of claim 8 wherein the control function comprises operation of an industrial process, the data-gathering step comprising receiving data from equipment implementing the industrial process.

18. A method for distributing control and monitoring operations, comprising the steps of:
   locating a remote controller on a network with a browser on a computer, the remote controller configured to gather status data relevant to an industrial control function;
   downloading a page defined by a markup language from the controller that includes the status data from the controller and an embedded program for viewing the status data on the computer; and
   the embedded program executing on the computer and causing the status data from the controller to be displayed on the computer in a dynamic fashion and periodically requesting updated status data from the controller.

19. The method of claim 18, wherein:
   the embedded program is a Java applet.

20. The method of claim 18, wherein:
   the embedded program is an ActiveX control.

21. The method of claim 18, wherein:
   the markup language is HTML.

22. The method of claim 18, wherein:
   the step of downloading is performed a single time.

23. The method of claim 18, further comprising the steps of:
   connecting the controller to a network; and
   connecting a remote computer to the network.

24. The method of claim 23, wherein:
   the network is an Internet protocol network.

25. The method of claim 24, wherein:
   at least a portion of the network is the Internet.

26. The method of claim 18, wherein:
   the embedded program includes instructions for retrieving updated data from the remote controller and for causing the updated data to be displayed on the computer in the same page that was downloaded in the downloading step.

27. The method of claim 18, wherein:
the page includes hyperlinks to other controllers on the network.

28. The method of claim 27, further comprising the steps of:
selecting a hyperlink included on the page that corresponds to a second remote controller;
downloading a second page defined by a markup language from the second remote controller that includes status data from the second remote controller and a second embedded program for viewing the status data from the second remote controller; and
executing the second embedded program on the computer causing the status data from the second remote controller to be displayed on the computer.

29. A method for allowing remote monitoring of a programmable logic controller by sending a single message from the programmable logic controller to a monitoring computer, comprising the steps of:
storing data relevant to an industrial control function to be monitored in a memory location of the programmable logic controller that is accessible over a network;
sending a single message to the monitoring computer including a page defined by a markup language that includes an executable program that when to be executed on the monitoring computer will cause the monitoring computer to periodically retrieve the data to be monitored from the memory location and will cause the data to be monitored to be displayed dynamically in a predetermined format on the monitoring computer and will cause the computer to periodically request updated data from the programmable logic controller.

30. A system for allowing remote monitoring of a programmable logic controller by sending a single message from the programmable logic controller to a monitoring computer, comprising:
means for storing data relevant to an industrial control function to be monitored in a memory location of the programmable logic controller that is accessible over a network;
means for sending a single message to the monitoring computer including a page defined by a markup language;
means for including in the single message an executable program to be executed on the monitoring computer causes the monitoring computer to retrieve the data to be monitored from the memory location, causes the data to be monitored to be displayed dynamically in a predetermined format on the monitoring computer, and causes the computer to periodically request updated data from the memory location.

31. A system for distributing control and monitoring operations, comprising:
means for controlling industrial equipment;
means for locating a remote controller on a network;
means for downloading from the means for controlling a page defined by a markup language that includes status data relevant to an industrial control function from the controller and an embedded program for viewing the status data; and
means for executing the embedded program on the computer and means for causing the status data from the controller to be dynamically displayed on the remote computer the embedded program configured to cause the computer to periodically download updated status data for display on the remote computer.

32. A computer implemented factory automation control system, comprising:
a remote computer having a processor, and
a memory having stored therein an executable program having processor readable instructions that when executed by said remote computer implements a factory automation control mechanism configured to cause said remote computer to periodically access a memory of a controller controlling equipment of a factory automation system via a browser for data relevant to an industrial control function, to display in the browser information relating to the data stored in the memory of the controller, to change the data stored in the memory of the controller by manipulating the information displayed in the browser, and to cause the remote computer to periodically request updated data from the controller.

* * * * *